(12) United States Patent
Ma

(10) Patent No.: US 6,873,393 B2
(45) Date of Patent: Mar. 29, 2005

(54) REFLECTIVE CHOLESTERIC DISPLAYS WITHOUT USING BRAGG REFLECTION

(76) Inventor: Yao-Dong Ma, 1866 Bethany Ave., San Jose, CA (US) 95132

( * ) Notice: Subject to any disclaimer, the term of this patent is extended or adjusted under 35 U.S.C. 154(b) by 110 days.

(21) Appl. No.: 10/173,384

(22) Filed: Jun. 15, 2002

(65) Prior Publication Data

US 2003/0231269 A1 Dec. 18, 2003

(51) Int. Cl.[7] .................. G02F 1/1335; G02F 1/137
(52) U.S. Cl. .................... 349/176; 349/96; 349/113
(58) Field of Search .................. 349/96, 98, 113, 349/115, 117, 119, 169, 175, 176; 359/494, 497, 500

(56) References Cited

U.S. PATENT DOCUMENTS

| | | | |
|---|---|---|---|
| 6,344,887 B1 * | 2/2002 | Ma et al. | 349/98 |
| 6,462,805 B1 * | 10/2002 | Wu et al. | 349/169 |
| 2003/0160923 A1 * | 8/2003 | Ma | 349/115 |

* cited by examiner

Primary Examiner—Toan Ton
Assistant Examiner—Tai Duong

(57) ABSTRACT

This invention relates to reflective cholesteric displays without using Bragg reflection. The helical pitch of the cholesteric liquid crystals may or may not be tuned in a visible wavelength, but its Bragg reflection will never be displayed. An elliptical polarizer with properly designed retardation and lamination positioned at the front of the display will be able to eliminate the Bragg reflection over a large viewing cone. The function of the display cell structure is merely a light shutter to switch the incident light ON and OFF. In the black-and-white display mode, the white state is achieved from the metal reflection in the cholesteric planar texture area; and the black state is obtained by cholesteric's depolarization effect and polarizer's filtration effect in the cholesteric focal conic texture area. In the full color mode, the full color state is created by the metal reflector and the micro-color filter in the cholesteric planar texture area; and the black state is realized in the cholesteric focal conic texture area. The reflective cholesteric display, remaining its long-term bistability but not applying the narrow-band Bragg reflection, initiates novel displays with a neutral wide-band reflection.

10 Claims, 3 Drawing Sheets

REFLECTIVE CHOLESTERIC DISPLAYS WITHOUT USING BRAGG REFLECTION

BACKGROUND OF THE INVENTION

Cholesteric liquid crystal displays are characterized by the fact that the pictures sty on the display even if the driving voltage is disconnected. The bistability and multistability also ensure a completely flicker-free static display and have the possibility of infinite multiplexing to create giant displays and/or ultra-high resolution displays. In cholesteric liquid crystals, the molecules are oriented in helices with a periodicity characteristic of material. In the planar state, the axis of this helix is perpendicular to the display plane. Light with a wavelength matching the pitch of the helix is reflected and the display appears bright. If an AC-voltage is applied, the structure of the liquid crystals changes from planar to focal conic texture. The focal conic state is predominately characterized by its highly diffused light scattering appearance caused by a distribution of small, birefringence domains, at the boundary between those domains the refractive index is abruptly changed. This texture has no single optic axis. The focal conic texture is typically milky-white (i.e., white light scattering). Both planar texture and focal conic texture can coexist in the same panel or entity. This is a very important property for display applications, whereby the gray scale can be realized.

Current cholesterics displays are utilizing "Bragg reflection", one of the intrinsic properties of cholesterics. In Bragg reflection, only a portion of the incident light with the same handedness of circular polarization and also within the specific wave band can reflect back to the viewer, which generates a monochrome display. The remaining spectrum of the incoming light, however, including the 50% opposite handedness circular polarized and out-off Bragg reflection wave band, will pass through the display and be absorbed by the black coating material on the back surface of the display to ensure the contrast ratio. The overall light utilization efficiency is rather low and it is not qualified in some applications, such as a billboard at normal ambient lighting condition. The Bragg type reflection gives an impression that monochrome display is one of the distinctive properties of the ChLCD.

In many applications, human eyes are friendlier with full color spectrum, i.e., white color information written on the dark background. With the development of the flat panel display, more and more displays with neutral color have come into being, such as black-and-white STN display and AMTFT display, etc. Unfortunately, both of these approaches involve major disadvantages and limitations. The AMTFT displays are not true zero field image storage systems because they require constant power input for image refreshing. The STN displays do not possess inherent gray scale capability as a result of the extreme steepness of the electro-optical response curve of the display. To realize a gray scale, the resolution has to be reduced by using, for example, four pixels instead of one per area. Anywhere from one to four pixels are activated at a particular time to provide the gray scale effect. The AMTFT devices use semiconductors to provide memory effects and involve use of expensive, ultra high resistance liquid crystal materials to minimize RC losses. Additionally, these displays are both difficult and costly to produce and they are, at present, limited to relatively small size displays. The cholesteric display has many advantages over the STN and AMTFT display with its zero field memory effect, hemispheric viewing angle, gray scale capability and other optical performances, but it obviously needs to come up with black-and-white solution in order to keep its superiority.

U.S. Pat. No. 5,796,454 introduces a black-and-white back-lit ChLC display. It includes controllable ChLC structure, the first circular-polarizer laminating to the first substrate of the cell which has the same circular polarity as the liquid crystals, the second circular polarizer laminating to the second substrate of the cell which has a circular polarity opposite to the liquid crystals, and a light source. The black-and-white back-lit display is preferably illuminated by a light source that produces natural "white" light. Thus, when the display is illuminated by incident light, the circular polarizer transmits the 50% component of the incident light that is right-circularly polarized. When the ChLC is in an ON state, the light reflected by the ChLC is that portion of the incident light having wavelengths within the intrinsic spectral bandwidth, and the same handedness; The light that is transmitted through the ChLC is the complement of the intrinsic color of ChLC. The transmitted light has right-circular polarization, however, it is thus blocked by left-circular polarizer. Therefore, the observer will perceive that region of the display to be substantially black. When the display is in a OFF sate, the light transmitted through the polarizer is optically scattered by the ChLC. The portion of the incident light that is forward-scattered is emitted from the controllable ChLC structure as depolarized light. The left-circularly polarized portion of the forward-scattered light is transmitted through the left-circular polarizer, thus, is perceived by an observer. The black-and-white display, in '454 patent is generated by back-lit component and the ambient light is nothing but noise.

U.S. Pat. No. 6,344,887 introduces a method of manufacturing a full spectrum reflective cholesteric display, herein is incorporated by '887 teaches a cholesteric display employing polarizers with the same polarity as liquid crystals. The display takes advantages of two reflections: Bragg reflection (the first reflection) and metal reflection (the second reflection). The display utilizes a circular polarizer and a metal reflector film positioned on the backside of the display to guide the second component of the incoming light back to the viewer. However, the shortcoming of the angular dependence of the Bragg reflection and the unbalance of the two reflections made the display appearing a tint of color in the optical ON state, for example, greenish white. The reasons for that are described as follows:

Firstly, all the wavelengths of the Bragg reflection from the planar state is additionally characterized by optical activity for wavelengths of incident light away from central wavelength $\lambda_o$. When the cell structure is illuminated with ambient light and $\lambda_o$ is in the visible spectrum, it reflects the lift to give an iridescent color with a narrow bandwidth and with the central wavelength $\lambda_o$ for the normal incident, and for the varied angle of incident beam and the angle of reflective beam.

Secondly, in many cholesteric materials, the central wavelength of the Bragg reflection, $\lambda_o$, is also very temperature sensitive. A color shift will happen if the temperature changes from 0° C. to 50° C. In order to reduce the color shift, more twisting material with opposite handedness have to dope to the liquid crystals, thus reduces the overall performances of the liquid crystal, for example, increasing the viscosity of the liquid crystal and decreasing the clear point or working temperature range of the liquid crystal display.

Thirdly, the absorptive polarizer has limited transmission and polarization efficiency that causes the second reflection having less intensity than that of the first one, this property makes the liquid crystal display an additional unbalance in the two reflections.

SUMMARY OF THE INVENTION

It is the primary objective of the present invention to realize a black-and-white display without any Bragg reflection in all wavelengths, including visible, infrared and ultra violent wave band.

It is another object of the present invention to devise an elliptical polarizer plate positioned at the front of a display, which may or may not separate from the display cell structure, to block the Bragg reflection out off the cell structure.

It is also another object of the present invention to make a thick retardation plate which has excellent mechanical stability, optical stability and uniformity. The retardation plate will laminate with the linear polarizer film in an optimal angle to eliminate elliptical polarization generated by the Bragg reflection.

It is still another objective of the present invention to created bright white state in display's planar texture.

It is also another objective of the present invention to create a dark black state in display's focal conic texture.

It is another further objective of the present invention to accomplish a neutral whiteness of the front reflection, which is a foundation of the black-and-white display and full color display.

The present invention is based upon the principles described as follows:

Optical ON State

The cholesteric display in planar texture works as a light transmitter to guide the incident light passing through the cell structure and bouncing back from the metal reflector. The Bragg reflection, wherein the light component with the same handedness as ChLC and with a narrow bandwidth determined by its helical pitch and the optical birefringence, will be never shown up to an observer, even if the cholesteric liquid crystal material is tuned in the visible wavelength. An elliptical polarizer with exactly opposite polarity to the cholesteric liquid crystal will cut off the Bragg reflection at almost all the viewing angles. On the other hand, the elliptical light component generated by the front elliptical polarizer passes the cell structure in planar texture area and passes the cell, again, by means of a metal material without changing the polarization state, or handedness (there is no half wave phase loss because of the addition of the second elliptical polarizer) and finally emerges to the front observer. Thus, theoretically 50% of the incoming light with a neutral light spectrum and with the handedness opposite to the Bragg reflection will return to the front side. Thus, the viewer still perceives full spectrum white color.

Optical OFF State

The incoming light reaches an elliptical polarizer with the opposite handedness of the ChLC and is cutoff more than 50%. The rest gets to the ChLC cell with focal conic texture and is depolarized by the scattering effect of the LC material. The light passes linear polarizer being cut off more than 50%, then is reflected by the metal surface and further passes through either an elliptical polarizer or a color filter or both of them, located between the ChLC cell and the metal reflector. The remaining light passes through the ChLC cell again is depolarized by the focal conic scattered texture then cut off more than half of it by the front elliptical polarizer, finally, only a very small portion of total light has a chance to reach the viewer. As a result, the special designed optical path, polarized-depolarized-polarized-depolarized-polarized, create a new optical dark state of cholesteric liquid crystal display. The term "polarized" means some of the light being absorbed and some becoming polarized light. And the term "depolarized" means the polarized light being neutralized by the scattering domain of LC and ready to be further cut off.

The contrast ratio between the above-mentioned optical ON state and OFF state in the present invention has reached 7.5:1 without the addition of an anti-reflective coating layer to the display.

DETAILED DESCRIPTION

Figure 1:
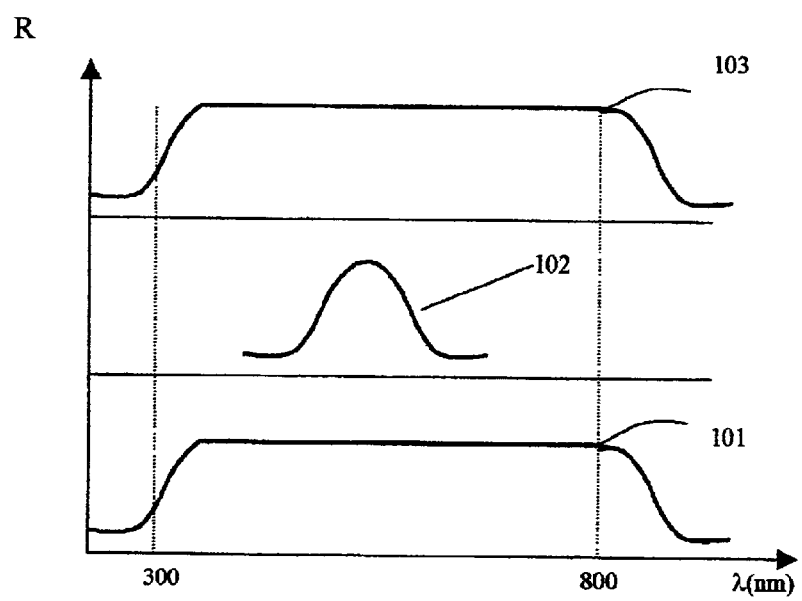
FIG. 1 shows a waveform out off the metal reflector, a waveform out off the cholesteric cell structure and a waveform out off the display's front elliptical polarizer.

Referring first to FIG. 1, illustrated are reflection waveforms from different reflective layers of the present display structure. Waveform 101 represents schematically the full spectrum reflection from a metal reflector, for example, an Aluminum reflective foil or an Aluminum deposited layer. The total reflectivity of such reflective layer is in the range of 80~90%. Theoretically, a silver thin film gives the highest reflection which is up to 95% but the cost is much higher than that of the Aluminum. If a natural light is reflected from such surface, as in the case of the cholesteric focal conic texture area, the reflection will be remaining the neutral light. If a circular polarized light is reflected from the metal surface, as in the case of the cholesteric planar texture area, the reflection will be remaining the circular polarization but in different polarity because of 180° phase shift. If a linear polarized light is reflected from the metal surface, as in the case of the twist nematic display, the reflection will be remaining the linear polarization with the same polarity as the incident linear polarization. Waveform 102 represents a Bragg reflection from the cholesteric planar texture area. In Bragg reflection, only a portion of the incident light with the same handedness of circular polarization and also within the specific wave band can reflect back to the viewer. However, in the real controllable planar texture, the Bragg reflection is no longer a pure circularly polarization, instead, it is truly an elliptical polarization because of the domain randomness and optic axis distributions. The Bragg reflection also has an intrinsic angular dependence, which always causes the color unbalances in the full spectrum black-and-white display applications. Waveform 103 represents a waveform of the present neutral full spectrum display. The novel display eliminates the Bragg reflection by means of an elliptical polarizer with its polarity exactly opposite to that of the cholesteric liquid crystals in a large viewing angle. On the other hand, the front elliptical polarizer ensures the entire light component reflected from the metal layer 101 to travel to the viewer side because of the same handedness with each other.

What is the fundamental difference of those state of the art from that of the prior art, U.S. Pat. No. 6,344,887, is that the latter teaches a cholesteric display employing polarizers with the same polarity as liquid crystals. '887 takes advantages of two reflections: Bragg reflection (the first reflection) and metal reflection (the second reflection), but the problem is that the first reflection always has higher intensity than the second one, especially in an oblique light condition, which causes a color shift. The present invention, on the contrary, introduces an elliptical front polarizer, possessing exactly opposite polarity to the ChLC in planar texture to quench the Bragg reflection substantially at almost any lighting angle and viewing angle, thus achieves a neutral black-and-white display as shown in the waveform 103.

Figure 2:
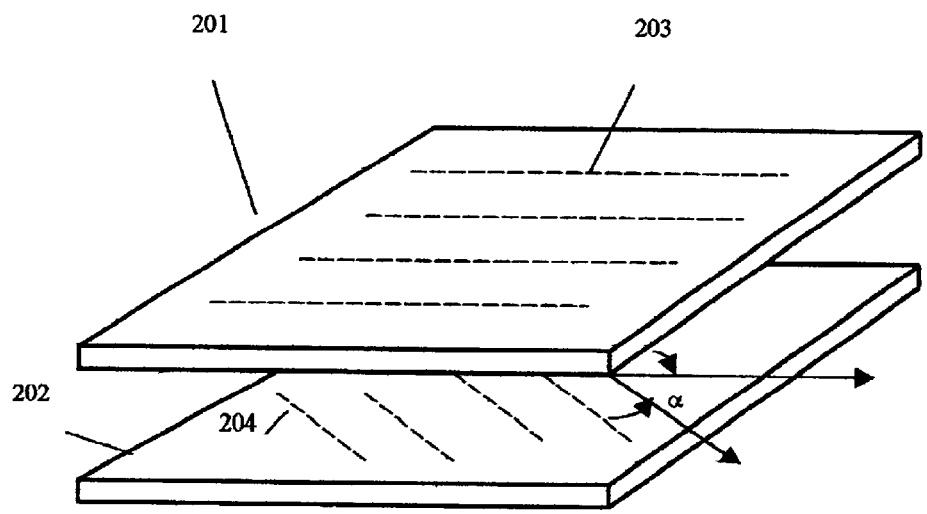
FIG. 2 shows a schematic structure of an elliptical polarizer.

Turning now to FIG. 2, illustrated is a schematic structure of an elliptical polarizer. A well-known circular polarizer film, in the prior art, is made of a linear polarizer film laminating with a quarter wave retardation film. The axis of the linear polarizer 203 and the axis of the quarter wave retarder always keeps an angle, $\alpha$, at 45-degree. However, to eliminate the Bragg reflection, an elliptical polarizer instead of a circular polarizer has to be used. This is because the fact that in the controllable planar texture, unlike a cholesteric dichroic mirror texture, the helical axis always keeps a variation from the vertical alignment. The variation depends on the surface conditions of the two display substrates and the driving conditions. The resultant Bragg reflection in the controllable planar texture, thus, belongs to an elliptical polarization. To suppress the Bragg reflection, it is necessary to design an elliptical polarizer with the opposite polarity with the Bragg reflection. The elliptical polarizer requires the retardation film with various retardation rate and with a various lamination angles, $\alpha$, relative to the linear polarizer.

The present invention provides a novel elliptical polarizer made of self-supportable retarder and linear polarizer to completely suppress the Bragg reflection. Traditional retardation film is made of thin polymer films such as PVA (polyvinyl alcohol) and PC (polycarbonate) that is stretched at certain ratio by the machine direction orientation (MDO). The film thickness is in the range of 0.05~0.1 mm and it is flexible for laminating onto the display panel directly. Since the film is very thin, the retardation rate is subject to shrink with time, humidity and temperature. The second problem with the stretched thin retardation film is the uniformity of the retardation rate. The accuracy of the retardation film normally is in the range of 10~20 nm. In order to gain better uniformity, a sophisticated stretching machine and temperature control is necessary.

In the present invention, however, the retardation plate is made of relatively thick polymeric plate with the thickness in the range of 0.10~1.0 mm. Such polymer includes polycarbonate (PC), polystyrene (PS) and so forth. Polycarbonate is good for relatively thinner plate from 0.10~0.60 mm, while polystyrene is an ideal solution for the thick plate with the thickness of 1.0 mm, partially because of the fact that the production and material cost is lower than other polymers and partially because of its high optical transparency. Note in out-door application, the polystyrene may cause a little bit yellowish problem compared with the polycarbonate material, so a suitable UV absorbing agent is necessary to cut off the UV component. Basically, any linear polymeric system with high refractive index and high optical transparence can be used for the application. Instead of stretching, the thick retarder is manufactured in a sophisticatedly controlled extrusion process where a very uniform molecular orientation is ensured. Because of high strength and stability of such novel retarder, a composite elliptical polarizer will be a self-supported protection layer of the cholesteric display. As a result, the display will totally meet the demand of the applications. The following are some examples of the front elliptical polarizers, which eliminate Bragg reflection from the cholesteric planar texture area.

EXAMPLE 1

A polycarbonate film with a thickness of 0.1 mm, produced in an extrusion process, was laminated with a linear polarizer with 44% transmission and 99.9% polarization efficiency at 46 degrees. The composite film is then attached onto the front outside surface of the cholesteric display by utilizing a pressure sensitive adhesion. The elliptical polarizer was effectively cut off the Bragg reflection in a 70-degree cone.

EXAMPLE 2

A polycarbonate film with a thickness of 0.3 mm, produced in an extrusion process, was laminated with a linear-polarizer with 44% transmission and 99.9% polarization efficiency at 18 degrees. The composite film is then attached onto the front outside surface of the cholesteric display by utilizing a pressure sensitive adhesion. The elliptical polarizer was effectively cut off the Bragg reflection in a 70-degree cone. The 18-degree lamination with the linear-polarizer saves a lot of material compared with 45-degree lamination because much less material will be trimmed off during the lamination process.

EXAMPLE 3

A polycarbonate film with a thickness of 0.6 mm, produced in an extrusion process, was laminated with a linear polarizer with 44% transmission and 99.9% polarization efficiency at 49 degrees. The composite film, with the total thickness of 0.8 mm, is then attached onto the front outside surface of the cholesteric display by utilizing a pressure sensitive adhesion. The elliptical polarizer was effectively cut off the Bragg reflection in a 70-degree cone. This composite layer is self-supportable and it can be used as a cover sheet, a touch panel substrate or front-light guiding plate of the display.

EXAMPLE 4

A polystyrene plate with a thickness of 1.0 mm, produced in an extrusion process, was laminated with a linear with 44% transmission and 99.9% polarization efficiency at 45 degrees. The composite plate, with the total thickness of 1.2 mm, is then positioned in the front outside surface of the cholesteric display as a separate protective panel. The elliptical polarizer was effectively cut off the Bragg reflection in a 70-degree cone. Despite of the shortcoming of the reverse image when the viewing angle has reached 40 degrees, the advantage of such thick supportable layer is superior mechanical stability of the display structure and the superior brightness in the normal condition. Needless to say, it cuts off substantially the surface reflection between the protection layer and the display cell structure.

EXAMPLE 5

The elliptical polarizer produced in Example 3 and 4 can be used as the contrast enhancement layer. It is demanded in some applications, for example, an electronic book for a student that a front plastic panel should be positioned in front of the glass display substrate and separated from the glass panel in a certain distance to protect the glass from being broken. The traditional plastic plate usually is made of polycarbonate (PC) plate. But the problem with the PC plate is that the multi-layer surface reflection made the display very poor in the contrast ratio, especially in the traditional cholesteric display. This invention, however, provides a best solution to the requirement. The self-support elliptical polarizer not only works as a mechanical protective panel, but also an eliminator of the multi-layer surface reflection while maintaining the principle of suppressing the Bragg reflection mentioned above.

EXAMPLE 6

A touch panel consists of a linear polarizer as a front panel and a polycarbonate plate as a back plate. The optical axis of the polarizer and the retarder are aligned in approximately 45 degrees. Note, both of those front and back plates have an internal transparent conductive ITO deposition layer and one of those plates has a higher resistivity in the range of 200~300 Ω/□. There are spacers with predetermined size and density between the linear polarizer and the retarder. Inside the substrates, a four-wire or five-wire electric circuitry is led out on the transparent conductive layer. The touch panel works as an elliptical polarizer as a whole to the cholesteric display. The other structure of the touch panel is that the composite structure of the elliptical polarizer is now becomes a front panel and an isotropic plastic panel works as the back plate of the touch plate. The latter eliminates all the surface reflection from the inside of the touch panel and the outside of the touch panel, while the former eliminates the reflection from the outside of the touch panel. In the present invention, a thick retardation plate, which has excellent mechanical stability and optical stability and uniformity, will be a structural material for the touch panel.

EXAMPLE 7

The retardation film, as a self-supporting structural layer, works not only as a back layer of the touch panel as that in Example 6, but also as a light-guiding plate of the front lighting system. The three-in-one structure simplifies display design and ensures a high transmittance of the display. The spacer of the touch panel is attached on the side of the front panel and the touch panel is always kept a little positive pressure to ensure the spacer of the touch panel never have a chance to physically touch to the bottom panel without a force or a pointing pressure of the writing input. The microstructure of the light guiding plate ensures all the light reflected onto the structure from the internal surfaces traveling back to the display panel without remarkable leakage to the front side. And the microstructure also ensures that all the light from the display panel easily passes through the structure. The reflective index of the light guiding plate on the viewer side actually is in the range of 1.8~2.0 due to the ITO deposition of the touch panel structure, which satisfies the full reflection condition in a wide internal reflection angle. The surface reflection loss in the air gap of the display panel and light guiding plate is substantially eliminated by the composition of the elliptical polarizer.

Most importantly, the present invention, which takes advantage of the elliptical polarizer to suppress the Bragg reflection, opens a new display area compared with the prior arts. From 1985 to 1989, a research team in Fujitsu has developed a four-color projection display using the double-layer cholesteric liquid crystals. The helical pitch of the liquid crystal was adjusted to a visible wavelength so that four-color display without a micro-color filter was invented. Although with some advantages in this kind of display, four colors reproductivity may restrict the availability of application fields. In 1991, Yang et al invented "cholesteric liquid crystal/polymer gel dispersion bistable at zero field" or polymer stabilized cholesteric texture (PSCT). Later, people realized that bistability at zero field is one of the intrinsic properties of cholesteric display as long as a suitable conditions were satisfied. Both the research teams tuned the liquid crystals in the visible wavelength and took the advantage of Bragg reflection as an optical ON state. As mentioned earlier, Bragg reflection has a narrow wavelength and angular dependences, which may not be satisfied in many applications. On the contrary, the present invention tunes the liquid crystal in the visible wavelength (but not limited to visible wavelength) but does not apply the Bragg reflection. Thus, the liquid crystal cell now becomes a pure light shutter instead of a color generator. With the help of the elliptical polarizer, the liquid crystal cell either guide the incident light back to the observer in one texture area of the display or block the incident light sufficiently from reaching the observer in the other texture area of the display.

Figure 3:
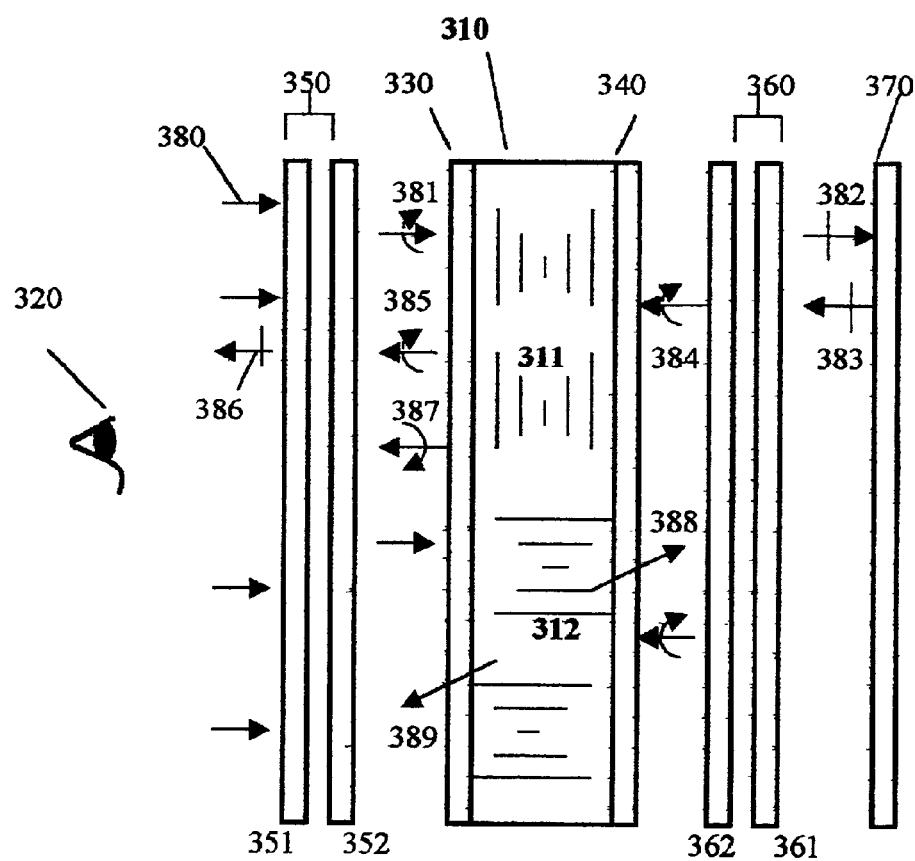
FIG. 3 shows a schematic display structure of a black-and-white reflective display.

Turning now to FIG. 3, illustrated is a neutral black-and-white cholesteric display structure laminated with a front elliptical polarizer REPS a back elliptical polarizer (BEP) and a metal reflector. The FEP is made of an optimal retarder laminated with linear polarizer film in an optional angle. The BEP is made of thin retarder and thin polarizer with the total thickness less than 0.3 mm. A natural light 380 first reaches the FEP 350 with the opposite handedness to that of liquid crystal material 310, for example, the right handed elliptical polarizer (RHEP) for the convenience of description.

As the FEP has the opposite handedness to the liquid crystal material 311 but the same handedness as the BEP, the Bragg reflection from the planar texture will be completely cut off, regardless whether the Bragg reflection is selected in the visible wavelength or in the invisible wavelength. When the Bragg reflection is designed in UV wave band, the reflection will be cut off by the UV absorbing agent in the front EP When the Bragg reflection is designed in visible and near infrared wave band, the reflection will be cut off by the FEP itself. When the natural light hits on the FEP 350, approximately 50% right handed 381 is allowed to pass. Due to the opposite handedness to the left handed LC material in the planar texture 311, all the RH light will pass through the ChLC cell structure without substantially attenuation. Only a small portion of the incident RH light with a large incident angle has a chance to reflect back (generally over 45°) and the majority of the light 382 will then be reflected back by the BEP 360 and the metal reflector 370. The light activities around the BEP can be further described as follows. RH light passing the retarder 362 becomes a linear polarization 382. Because of the same optical direction of the retarder 362 and linear polarizer 361, linear polarization will pass the linear polarizer 361 without attenuation. The linear polarization 382 further hits on the metal reflector 370 and bounces back on the surface of the metal. The backward light 383 will remain its polarity (the same linear vibration direction) after being reflected. The light 383 passing the linear polarizer with the same axis maintaining its linear polarization state until it further passes the retarder where it turns into elliptical polarization 384. Furthermore, the light 384 passes the planer area 311, then the FEP and finally emerges to the display front surface as a linear polarization 385. As a result, the bright neutral white optical ON state will take on in the portion of the display's planar texture area. If a Bragg reflection 387 introduces in any circumstance, for example, in a front light system, or a side light from a touch panel system, Bragg reflection light 387 may be generated, but it will be completely cut off by the FEP due to the opposite polarity.

It is noticed that the brightness of the display or the intensity of the light 385 depends on the following parameters. Firstly, the transmittance of the back linear polarizer 361 plays an important role. It is preferred to choose the transmission of the back linear polarizer in the range of 48%~52% while maintaining the polarization efficiency above 90% (the efficiency out of the blue wave band is higher than 95%). Secondly, the profile of the metal reflector should be ensuring a high reflection in a large diffusive cone. Thirdly, the average domain distribution of the planar texture should be tilted to the normal direction in 5~10 degrees, which is controlled by the surface rubbing condition and pre-tilt angle of the alignment layer.

As the ChLC display structure addressed in a focal conic texture 312, the display works at optical OFF state. The incident light 380 reaches the FEP 350 and is cut off more than 50%. The rest of it 381 gets to the ChLC cell with focal conic texture 312 and is depolarized by the scattering effect of the LC material into a non-polarized light 388. As the neutral non-polarized light 388 hits on the BEP and the metal reflector, 50% right handed polarized light will be reflected back and the other 50% left handed light will be absorbed by the BEP. The remaining light passes the ChLC cell again and becomes depolarized light 389 due to the same focal conic scattering effect. The non-polarized light 389 reaches the FEP and half of it is getting further lost. Finally, only a small portion of the total light (less than 4%) will be emerging to the front as scattered polarized light. Human eyes 320 perceive only a small portion of the incident light. It is surprisingly discovered that the present invention has realized better blackness than that of the prior art.

The differences between U.S. Pat. No. 6,344,887 and the present invention in the optical ON state can be described as follows. In '887 patent, two absorptive circular polarizers are designed in the same handedness, which not only have the same handedness with each other but keep the same handedness as the cholesteric liquid crystal material as well. In '887 patent, the Bragg reflection is not attenuated by the front circular polarizer because the same handedness as the liquid crystal material. On the contrary, in the present invention, the Bragg reflection from the display's planar structure can be completely blocked by the front elliptical polarizer. Therefore, a neutral black-and-white with high brightness cholesteric display is then achieved.

Figure 4:
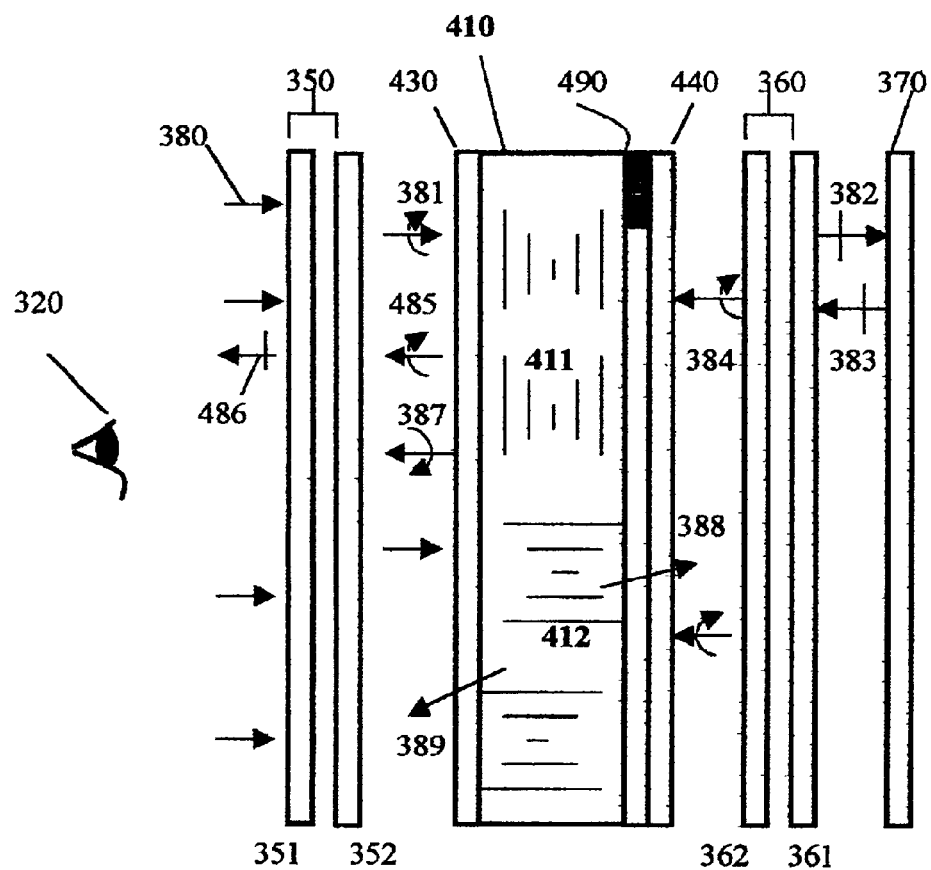
FIG. 4 shows a schematic display structure of a full color reflective display.

Turning now to FIG. 4, illustrated is a sectional structure of a full color display where an absorptive color filter 490 is deposited on the back substrate 440. In the front-lit mode, FEP 350 has the same polarity as the BEP 360 but opposite to the cholesteric liquid crystals inside the display cell 410. The Bragg reflection out of 410 will be cut off by the FEP 350, so that the color information is merely generated by the metal reflector 370 and the color filter 490. Full color optical ON state takes on in the planar texture area, and black optical OFF state in the focal conic texture area respectively.

As the FEP has the opposite handedness to the liquid crystal material 411 but the same handedness as the BEP, the Bragg reflection from the planar texture will be completely cut off, regardless whether the Bragg reflection is selected in the visible wavelength or in the invisible wavelength. When the Bragg reflection is designed in UV wave band, the reflection will be cut off by the UV absorbing agent in the FEP. When the Bragg reflection is designed in visible and near infrared wave ban, the reflection will be cut off by the FEP's dichroic absorption. When the natural light hits on the FEP 350, approximately 50% right handed 381 is allowed to pass. Due to the opposite handedness with the left handed LC material in the planar texture 411, all the RH light will pass through the ChLC cell structure without substantially attenuation. Only a very small portion of the incident RH light with a large incident angle has a chance to reflect back (generally over 45°) and the majority of the light 384 will then be reflected back by the BEP 360 and the metal reflector 370. The light activities around the BEP can be further described as follows. RH light 381 passing the retarder 362 becomes a linear polarization. Because of the same optical direction of the retarder 362 and linear polarizer 361, linear polarization will pass the linear polarizer 361 without attenuation. The linear polarization 382 further hits on the metal reflector 370 and bounces back on the surface of the metal. The backward light 383 will remain its polarity (the same linear vibration direction) after being reflected. The light 383 passing the linear polarizer with the same axis maintaining its linear polarization state until it further passes the retarder where it turns into elliptical polarization 384. Furthermore, the light 384 passing the micro color filter layer at the top of the display substrate 440 becomes a color light 485. The micro color filter array, corresponding to the sub-pixel of the dotted electrode, is a red, green and blue pigment patterning deposited onto the back substrate of the display cell structure. In the reflective mode, the thickness of the color filter is usually in the range of 0.6~0.8 $\mu$m. The color light 485 further passes the display cell structure in planer area 311, then the FEP and finally emerges to the display front surface as a linear polarization 486. As a result, the bright full color ON state will take on in the portion of the display's planar texture area. If a Bragg reflection 387 is being introduced in any circumstance, for example, in a front light system, or a side light from a touch panel system, where Bragg reflection light 387 may be generated. It will be completely cut off by the FEP due to the opposite polarity.

It is noticed that the brightness of the display or the intensity of the light 385 depends on the following parameters. Firstly, the transmittance of the back linear polarizer 361 plays an important role. It is preferred to choose the transmission of the back linear polarizer in the range of 48%~52% while maintaining the polarization efficiency above 90% (the efficiency out of the blue wave band is higher than 95%) Secondly, the profile of the metal reflector should be ensuring a high reflection in a large diffusive cone. Thirdly, the average domain distribution of the planar texture should be tilted to the normal direction in 5~10 degrees, which is controlled by the surface rubbing condition and pre-tilt angle of the alignment layer.

As the ChLC display structure addressed in a focal conic texture 412, the display works at optical OFF state. The incident light 380 reaches the FEP 350 and is cut off more than 50%. The rest of it 381 gets to the ChLC cell with focal conic texture 412 and is depolarized by the scattering effect of the LC material into a non-polarized light 388. As the neutral non-polarized light 388 hits on the BEP and the metal reflector, 50% right handed polarized light will be reflected back and the other 50% left handed polarized light will be absorbed by the BEP. The remaining light passes the ChLC cell again and becomes depolarized light 389 due to the same focal conic scattering effect. The non-polarized light 389 reaches the FEP and half of it is getting further lost. Finally, only a small portion of the total light (less than 4%) will be able to emerge to the front as scattered polarized light. Human eyes 320 perceive only a small portion of incident light. It is surprisingly discovered that the present invention has realized better blackness than that of the prior art.

The differences between U.S. Pat. No. 6,344,887 and the present invention in the optical ON state can be described as follows. In '887 patent, two circular-polarizers are designed in the same handedness, which not only have the same handedness with each other but keep the same handedness as the cholesteric liquid crystal material as well. Thus, in '887 patent, the Bragg reflection is not attenuated by the front circular polarizer because the same handedness as the liquid crystal material. On the contrary, in the present invention, the Bragg reflection from the display's planar structure can be completely blocked by the front elliptical polarizer. The other difference is the position of the color filter layer. In '887 patent the color filter layer is located at the front substrate of the display cell structure to modulate both the metal reflection and the Bragg reflection, while in the present invention, the color filter layer may be positioned at either the front substrate or the back subsume of the display.

I claim:

1. A reflective display comprising:
   a. an elliptical polarizer, and
   b. a cholesteric display cell structure with at least one controllable planar texture area and one controllable focal conic texture area,
   wherein the elliptical polarizer, located at front of the display cell structure, has exactly opposite polarity to the Bragg reflection from the cholesteric display cell structure,
   whereby the elliptical polarizer will substantially eliminate the Bragg reflection in one polarity and substantially transmits a full spectrum of incoming light in the other polarity,
   whereby the reflective display takes on a neutral appearances.

2. The reflective display as in claim 1 wherein the Bragg reflection is an elliptical polarization.

3. The reflective display as in claim 1 wherein the Bragg reflection is tuned in visible wavelength.

4. The reflective display as in claim 1 wherein the Bragg reflection is tuned in invisible wavelength.

5. The reflective display as in claim 1 further including a second elliptical polarizer located at the back side of the display cell structure and a metal reflector at the utmost back side of the display.

6. The reflective display as in claim 5 wherein the second elliptical polarizer has the same polarity as the first elliptical polarizer to suppress backward Bragg reflection.

7. The reflective display as in claim 5 wherein the second elliptical polarizer is disposed in such a way that the incoming light passing through the first elliptical polarizer and the display cell structure will be reflected by the metal reflector without 180° phase change, and that the reflected light passing back though the display cell structure and the first elliptical polarizer will finally emerge to the observer.

8. The reflective display as in claim 5 wherein the metal reflector is a full spectrum linear-polarized-light reflecting unit.

9. The reflective display as in claim 1 wherein the neutral appearances is a black-and-white display result.

10. The reflective display as in claim 1 wherein the neutral appearances is a full color display result.

* * * * *